United States Patent [19]

Sun et al.

[11] Patent Number: 4,974,667
[45] Date of Patent: Dec. 4, 1990

[54] THERMAL ACTUATED SWITCHABLE HEAT PIPE

[75] Inventors: Tsu-Hung Sun; Mark Hanes, both of Torrance, Calif.

[73] Assignee: Hughes Aircraft Company, Los Angeles, Calif.

[21] Appl. No.: 419,419

[22] Filed: Oct. 10, 1989

[51] Int. Cl.⁵ .............................................. F28D 15/02
[52] U.S. Cl. ...................................... 165/41; 165/32; 237/5; 237/12.3 B
[58] Field of Search ................... 165/32, 96, 41; 237/5, 237/12.3 B

[56] References Cited

U.S. PATENT DOCUMENTS 4,693,306  9/1987  Nilson ........................... 165/104.21

FOREIGN PATENT DOCUMENTS 3821138  3/1989  Fed. Rep. of Germany ... 237/12.3 B
823772  4/1981  U.S.S.R. ................................ 165/32
941834  7/1982  U.S.S.R. ................................ 165/32

Primary Examiner—Albert W. Davis, Jr.
Attorney, Agent, or Firm—Terje Gudmestad; Wanda K. Denson-Low

[57] ABSTRACT

A thermal actuated switchable heat pipe 10 for use in a passenger compartment heating system of an automotive vehicle. The invention 10 includes a condenser 12, an evaporator, 14 vapor and fluid flow paths 16 and 18 therebetween and a working fluid 20 disposed therein. A thermostat 46 is mounted between the condenser 12 and the evaporator 14 for controlling the flow of fluid 20 therebetween. In a specific embodiment, the condenser 12 is in thermal contact with the engine coolant of the vehicle and the evaporator 14 is in thermal contact with the exhaust of the vehicle. The thermostat 46 is in thermal contact with the engine cooling system and is adapted to block the flow of fluid 20 in the fluid flow path 18 in response to the temperature thereof.

3 Claims, 2 Drawing Sheets

THERMAL ACTUATED SWITCHABLE HEAT PIPE

BACKGROUND OF THE INVENTION

1. Field of the Invention:

The present invention relates to heating and cooling systems. More specifically, the present invention relates to methods and apparatus for heating the passenger compartment of a motorized vehicle.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art:

Conventional automotive passenger compartment heating systems utilize a heat exchanger to tap thermal energy from a coolant loop which serves ordinarily to cool the engine. While such systems have heretofore been somewhat adequate for this task, it has been recognized that as automotive engines become more and more efficient, waste heat from the engine may be insufficient to heat the passenger compartment to desired temperatures within nominal time constraints. Accordingly, a need has been recognized in the art for a fast acting, automotive passenger heating system which does not require heat from engine cooling system for effective operation.

One alternative approach involves the use of a separate system with a heat pipe and a blower. A heat pipe is a passive hermetically sealed closed container which contains a capillary-wick structure, retained against the inner walls of the pipe soaked by a small amount of vaporizable (working) fluid. The heat pipe employs a vaporization-condensation cycle with the capillary wick pumping the condensate to the evaporator. That is, when heat is applied to one end of the pipe, the working fluid vaporizes, travels to the cool end of the pipe and condenses. In the process of condensation, the fluid releases the heat to the exterior of the pipe. The working fluid returns to the warm portion of the pipe via the wick and the process is repeated. As the vapor pressure drop between the evaporator and condenser is very small, the cycle is essentially an isothermal process. With proper design, the heat pipe can transfer large amounts of heat with minimal temperature losses. See U.S. Pat. No. 4,007,777 entitled Switchable Heat Pipe Assembly by Tsu Hung Sun, issued Feb. 15, 1977.

Unfortunately, the heat pipe/blower system exhibits considerable thermal expansion necessitating the use of an expensive bellows and additional hardware. This system also requires an air cooled heat exchanger.

Another system developed by Volvo and described in U.S. Pat. No. 4,693,306 utilizes a heat pipe between the cooling system and the exhaust pipe of the vehicle. However, no control system is disclosed for this system. Accordingly, there is a need in the art for a thermally controllable heat pipe based passenger compartment heating system utilizing exhaust heat from the vehicle.

SUMMARY OF THE INVENTION

The need in the art is addressed by the present invention which provides a thermal actuated switchable heat pipe for use in a passenger compartment heating system of an automotive vehicle. The invention includes a condenser, an evaporator, vapor and fluid flow paths therebetween and a working fluid disposed therein. A thermostat is mounted between the condenser and the evaporator for controlling the flow of fluid therebetween.

In a specific embodiment, the condenser is in thermal contact with the engine cooling system of the vehicle and the evaporator is in thermal contact with the exhaust system of the vehicle. The thermostat is in thermal contact with the engine cooling system and is adapted to block the flow of fluid in the fluid flow path in response to the temperature thereof.

DESCRIPTION OF THE INVENTION

Figure 1:
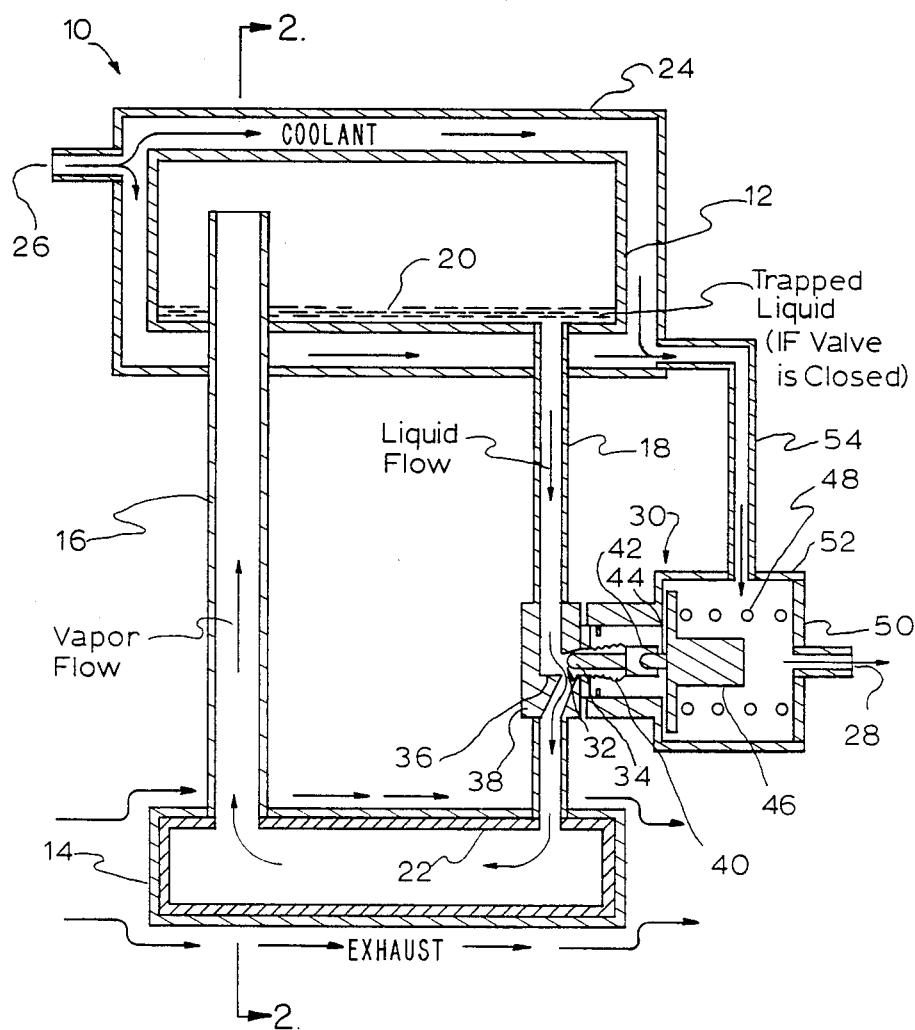
FIG. 1 is a simplified sectional side view of an illustrative embodiment of the thermal actuated switchable heat pipe of the present invention.
Figure 2:
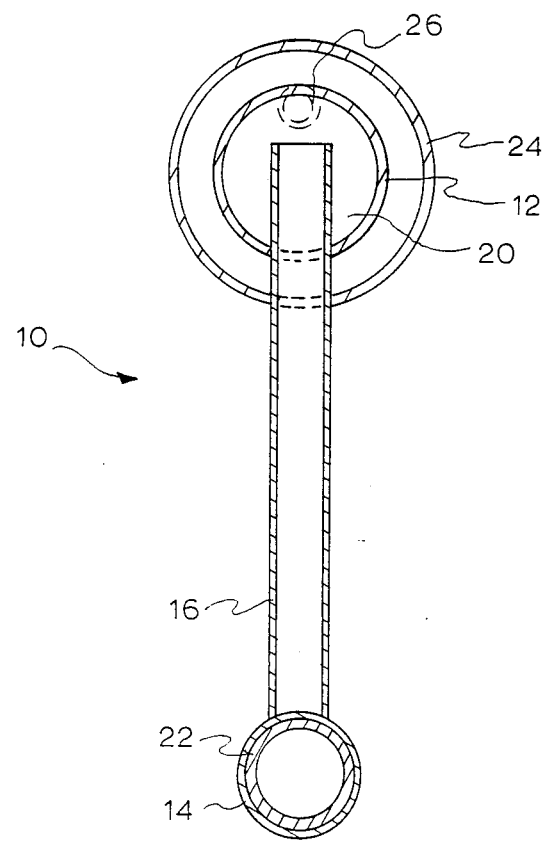
FIG. 2 is a sectional end view of the thermal actuated switchable heat pipe of FIG. 1 taken along the line 2—2 thereof.

FIG. 1 is a simplified sectional side view of an illustrative embodiment of the thermal actuated switchable heat pipe 10 of the present invention. FIG. 2 is a sectional end view of the thermal actuated switchable heat pipe of FIG. 1 taken along the line A—A thereof.

As shown in FIG. 1, the invention 10 includes a condenser 12, an evaporator 14, a vapor flow path 16 between the evaporator 14 and the condenser 12 and a fluid flow path 18 between the condenser 12 and the evaporator 14. A small amount of vaporization (working) fluid 20 is provided within the condenser 12. The heat pipe 10 is constructed of monel or other suitable material. The condenser 12, evaporator 14, vapor and fluid flow paths 16 and 18, and working fluid 20 provide a conventional heat pipe. Heat pipes are known in the art. See for example, *Heat Pipe Theory and Practice* by S. W. Chi, McGraw-Hill (1976) and the above-referenced U.S. Pat. No. 4,007,777 entitled Switchable Heat Pipe Assembly by Tsu Hung Sun, issued Feb. 15, 1977.

As shown in FIG. 1, the heat pipe 10 is set up to operate in a gravitational field. That is, the evaporator 14 is situated below the condenser 12. The evaporator 14 includes a capillary wick 22 such as screen or other suitable material.

The evaporator 14 is mounted in the exhaust flow path of an automotive vehicle (not shown). The condenser 12 is mounted within a coolant jacket 24 in thermal contact with the engine coolant of the vehicle. Heat from the engine exhaust of the vehicle causes the working fluid in the evaporator 14 to vaporize and flow up the vapor flow path 16 to the condenser 12. The engine coolant enters an inlet port 26, circulates about the condenser 12 and exits via an outlet 28 and on. Thus, the condenser 12 is maintained at a lower temperature than the evaporator 14. As a result, the vapor of working fluid 20 condenses into liquid form in the condenser 12. The condensed fluid returns to the evaporator 14 via the liquid flow path 18 and the cycle is complete.

A particularly novel aspect of the invention is the provision of a mechanism for controlling the operating temperature of the pipe 10. For this purpose, a control module 30 is disposed in the fluid flow path 18. The module 30 includes a shut off valve 32 with a plunger 34 adapted to close a "Z" shaped fluid flow channel 36 in a coupling 38. The plunger 34 may be constructed of copper or other suitable material. The coupling 38 may be made of monel or other suitable material. The plunger 34 is surrounded by a bellows 40. The plunger 34 is connected by a link 42 to the push pin 44 of a conventional thermostat 46. The thermostat 46 is retained within the control module 30 by a spring 48 and a removable end cap 50 which may be threadably engaged within the housing 52 of the module 30. The coolant outlet 28 is provided in the end cap 50. A conduit 54 is provided from the coolant jacket 24 to the control module 30. Thus, the engine coolant is allowed to flow into thermal contact with the thermostat 46.

When the coolant temperature exceeds the set point of the thermostat 46, the push pin 44 extends and closes the valve 32. This interrupts the operation of the heat pipe stops the flow of the heat from the exhaust to the coolant. Likewise, when the temperature of the fluid drops below the set point, the pin 44 is retracted and the fluid 20 is allowed to return to the evaporator 14. This allows the engine coolant to be heated once again. The engine coolant is used to provide heat to the passenger compartment of the vehicle (not shown) in a conventional manner.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A thermal actuated switchable heat pipe for use in a passenger compartment heating system of an automotive vehicle having an engine cooling system and an exhaust system, said thermal actuated switchable heat pipe comprising:
    a condenser in thermal contact with said engine cooling system of said automotive vehicle;
    an evaporator in thermal contact with said exhaust system of said automotive vehicle;
    a vapor flow path between said evaporator and said condenser;
    a fluid flow path between said condenser and said evaporator;
    a working fluid disposed within said evaporator; and
    thermostat means mounted in said fluid flow path between said condenser and said evaporator for controlling the flow of fluid therebetween, said thermostat means including a thermostat in thermal contact with said engine cooling system.

2. The invention of claim 1 wherein said thermostat means includes valve means for blocking the flow of fluid in said fluid flow means.

3. A heating system for the passenger compartment of an automotive vehicle having an engine cooling system and an exhaust system comprising:
    a hear pipe including a condenser in thermal contact with said engine cooling system, an evaporator in thermal contact with said exhaust system, fluid flow means therebetween, and a working fluid disposed therein and
    thermostat means mounted between said condenser and said evaporator for controlling the flow of fluid therebetween, said thermostat means including valve means for blocking the flow of fluid in said fluid flow means and a thermostat in thermal contact with a coolant disposed in said engine cooling system.

* * * * *